(12) United States Patent
Trowbridge

(10) Patent No.: US 7,730,464 B2
(45) Date of Patent: Jun. 1, 2010

(54) CODE COMPILATION MANAGEMENT SERVICE

(75) Inventor: Sean E. Trowbridge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1295 days.

(21) Appl. No.: 11/227,702

(22) Filed: Sep. 14, 2005

(65) Prior Publication Data

US 2007/0061787 A1    Mar. 15, 2007

(51) Int. Cl.
   *G06F 9/45*    (2006.01)
(52) U.S. Cl. .................. 717/140; 717/148; 717/152; 717/153

(58) Field of Classification Search .......... 717/136–161
   See application file for complete search history.

(56) References Cited

U.S. PATENT DOCUMENTS

| 6,484,313 | B1 * | 11/2002 | Trowbridge et al. | 717/146 |
| 6,799,314 | B2 * | 9/2004 | Beniyama et al. | 717/100 |
| 2002/0066086 | A1 * | 5/2002 | Linden | 717/145 |
| 2004/0123278 | A1 * | 6/2004 | Nanja et al. | 717/153 |
| 2006/0048120 | A1 * | 3/2006 | Archambault et al. | 717/160 |

* cited by examiner

*Primary Examiner*—Wei Y Zhen
*Assistant Examiner*—Satish Rampuria

(57) ABSTRACT

The contents of a cache of specialized code interpreted into an intermediate language may be recompiled for execution in a managed execution environment in accordance with an automated process in such a manner to minimize any impact on machine resources.

15 Claims, 4 Drawing Sheets

CODE COMPILATION MANAGEMENT SERVICE

BACKGROUND

Software components may be distributed in an intermediate language (IL) format rather than in a native platform execution format at install time, and methods and systems have been developed to recompile the IL modules to native code. However, between install time and runtime, changes may be made to an application, program, method, function, or other assemblage of programmable and executable code to which the IL components correspond. Thus, components loaded at install time may not be useful at runtime.

SUMMARY

The contents of a cache of specialized code interpreted into an intermediate language may be recompiled for execution in a managed execution environment in accordance with an automated process.

DESCRIPTION OF THE DRAWINGS

The present invention will be described in accordance with the following figures.

DETAILED DESCRIPTION

Code compilation management services are described herein. More particularly, the description herein pertains to services, methods, programs, and other implementations for understanding the contents of a cache of specialized native images so as to manage the appropriateness and timing of compilation of the intermediate language code for execution in a managed execution environment.

Figure 1:
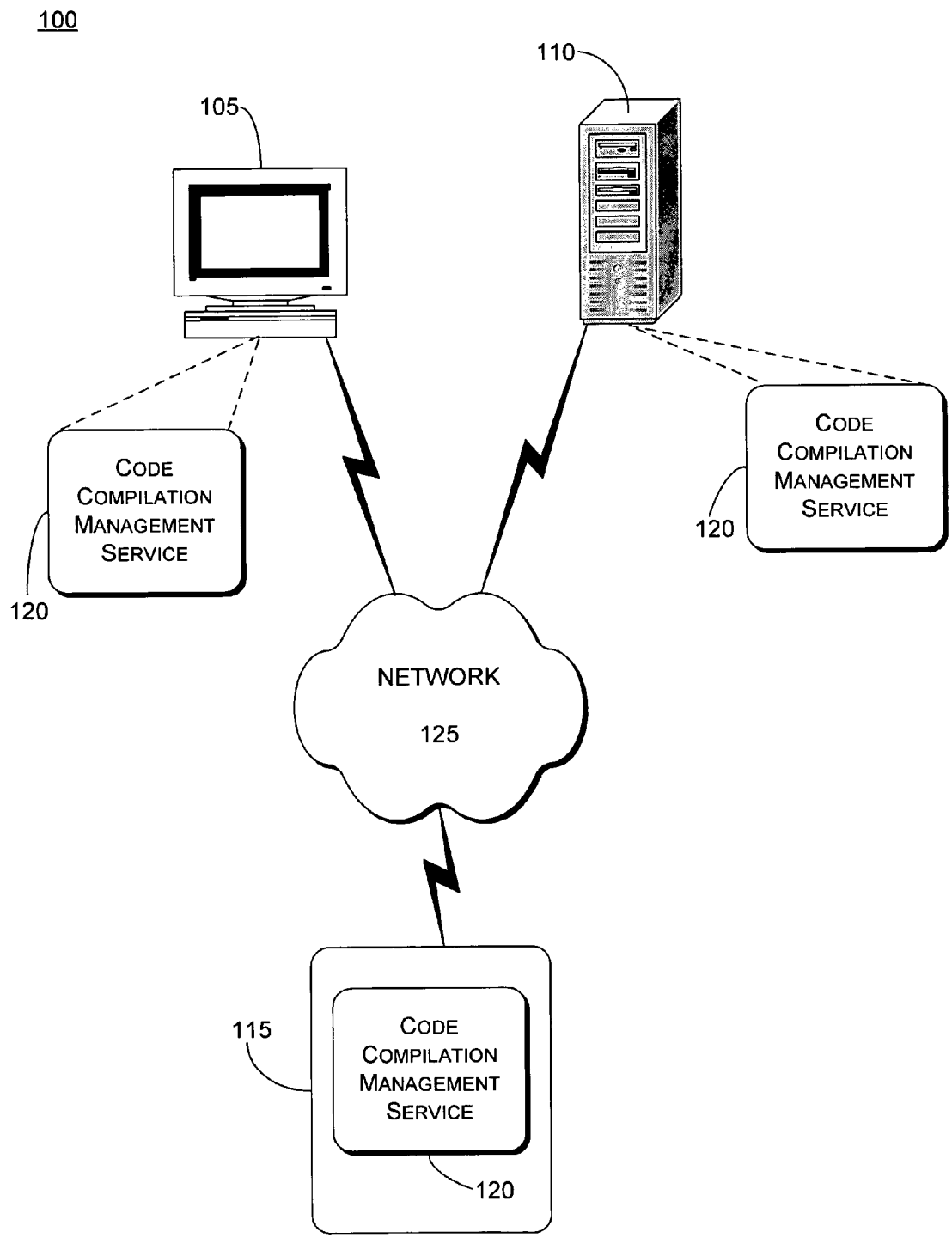
FIG. 1 shows devices communicating over a network, with the devices implementing example technologies for code compilation management.

FIG. 1 shows example network environment 100 in which examples of code compilation management services may be implemented, although the examples of code compilation management services are not necessarily limited to network environments. Regardless, in FIG. 1, client device 105, server device 110, and "other" device 115 may be communicatively coupled to one another via network 125; and, further, at least one of client device 105, server device 110, and "other" device 115 may be capable of implementing code compilation management services 120, as described herein.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115 in accordance with at least one implementation of code compilation management services 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 is any device that may be a content source, and client device 105 is any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may be any further device that is capable of implementing code compilation management services 120 according to one or more of the examples described herein. That is, "other" device 115 may be any software-enabled computing or processing device that is capable of implementing code compilation management services for an application, program, function, or other assemblage of programmable and executable code in at least a managed execution environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as 802.11 system; a personal area network (i.e., PAN), such as Bluetooth.

Computer architecture in at least one of devices 105, 110, and 115 has typically defined computing platforms in terms of hardware and software. Software for computing devices came to be categorized into groups, based on function, which include: a hardware abstraction layer (alternatively referred to as a "HAL"), an operating system (alternatively referred to as "OS"), and applications.

A runtime execution environment may refer to an isolated space, between the OS and an application, in which the application may execute specific tasks on at least one of processing device 105, 110, or 105. More particularly, the runtime execution environment is intended to enhance the reliability of the execution of applications on a growing range of processing devices including servers, desktop computers, laptop computers, and mobile processing devices by providing a layer of abstraction and services for an application running on such processing devices, and further providing the application with capabilities including code compilation management services.

A runtime execution environment may serve as at least one of an application programming and application execution platform. As an application programming platform, a runtime execution environment may compile targeted applications, which may be written in one of multiple computing languages, into an intermediate language (hereafter "IL"), which is typically independent of the platform. IL may be executed by an execution module within a runtime execution environment or by central processing unit (hereafter "CPU") in a non-managed execution environment even though IL is a higher level language than many CPU machine languages.

As an application execution platform, a runtime execution environment may interpret compiled IL into native machine instructions. A runtime execution environment may utilize either an interpreter or a "just-in-time" (hereafter "JIT") compiler to execute such instructions. Regardless, the native machine instructions may then be directly executed by an execution module within the runtime execution environment or by the CPU. Since IL is CPU-independent, IL may execute on any CPU platform as long as the OS running on that CPU platform hosts an appropriate runtime execution environment.

Examples of runtime environments, to which code compilation management services 120 may pertain, include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine. However, such listing provides examples only. The example implementations are not limited to just these managed execution environments. Further, the example implementations are not just limited to managed execution environments, for one or more examples may be implemented within testing environments and/or unmanaged execution environments.

An application compiled into IL may be referred to as "managed code," and therefore a runtime execution environment may be alternatively referred to as a "managed execution environment." It is noted that code that does not utilize a runtime execution environment to execute may be referred to as native code applications.

Figure 2:
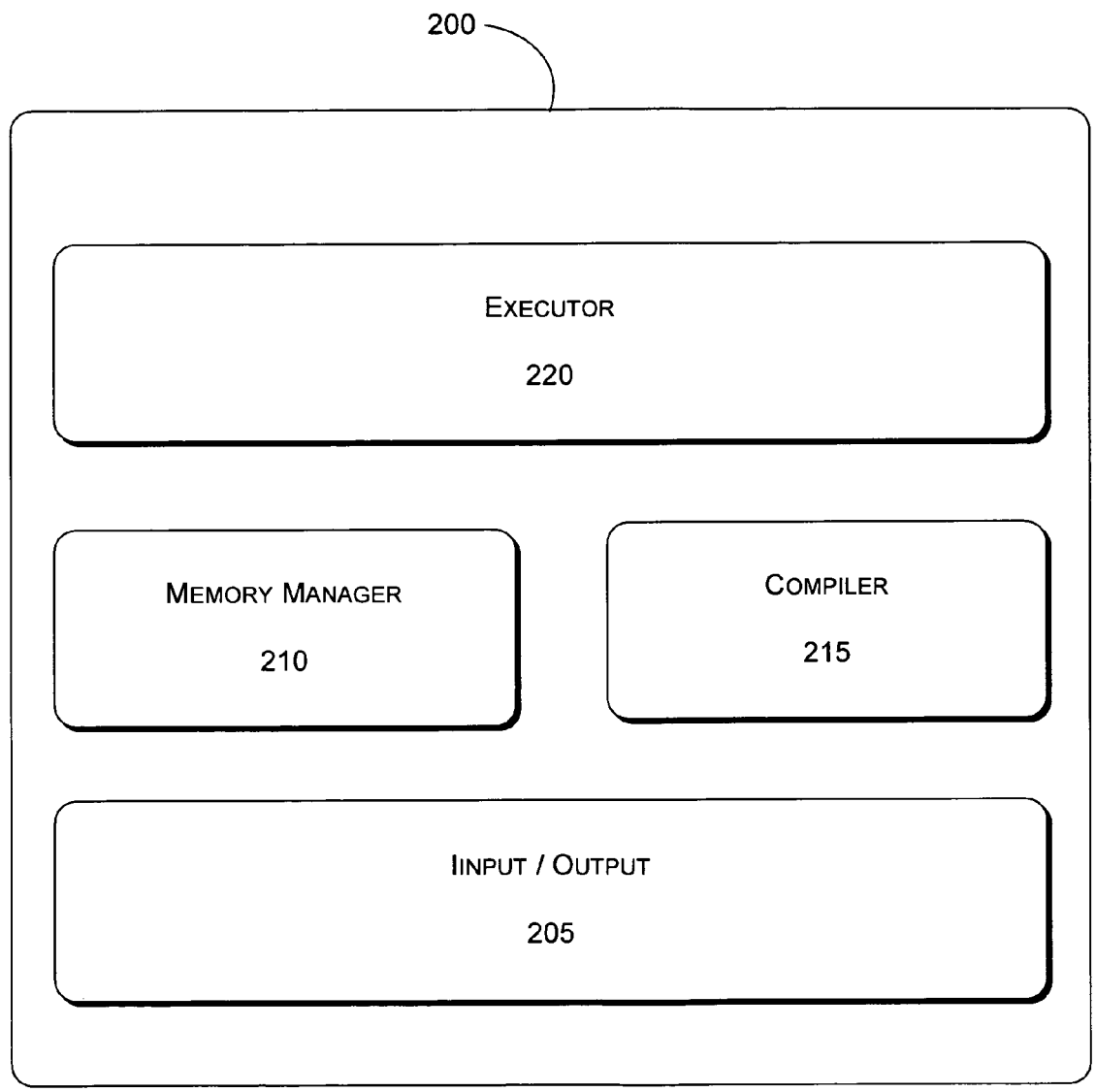
FIG. 2 shows an example of an execution environment for implementing example technologies for code compilation management.

FIG. 2 shows an example of runtime execution environment 200 in which examples of code compilation management services 120 (see FIG. 1) may be implemented.

Figure 3:
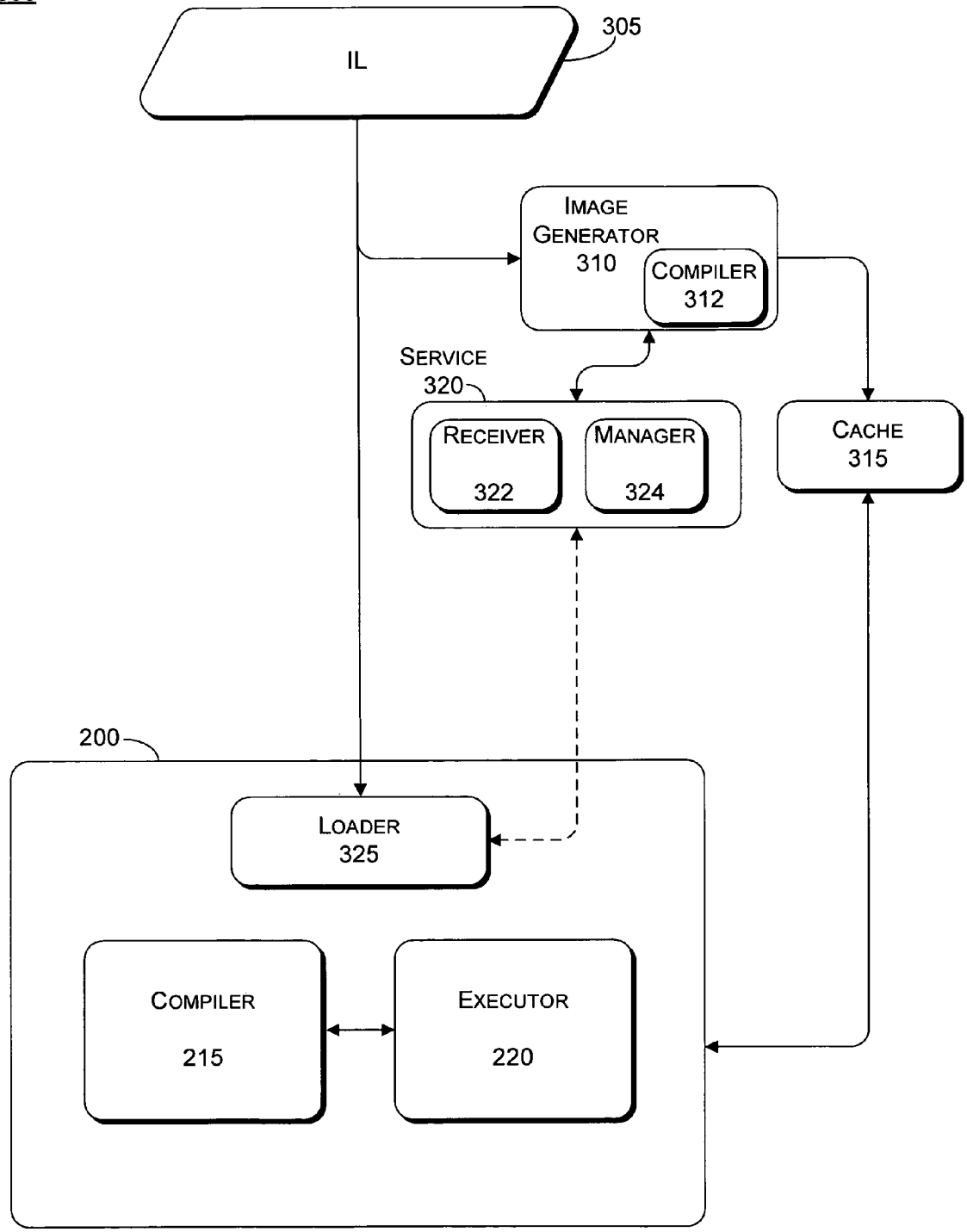
FIG. 3 shows an example data flow in accordance with an example implementation of code compilation management.
Figure 4:
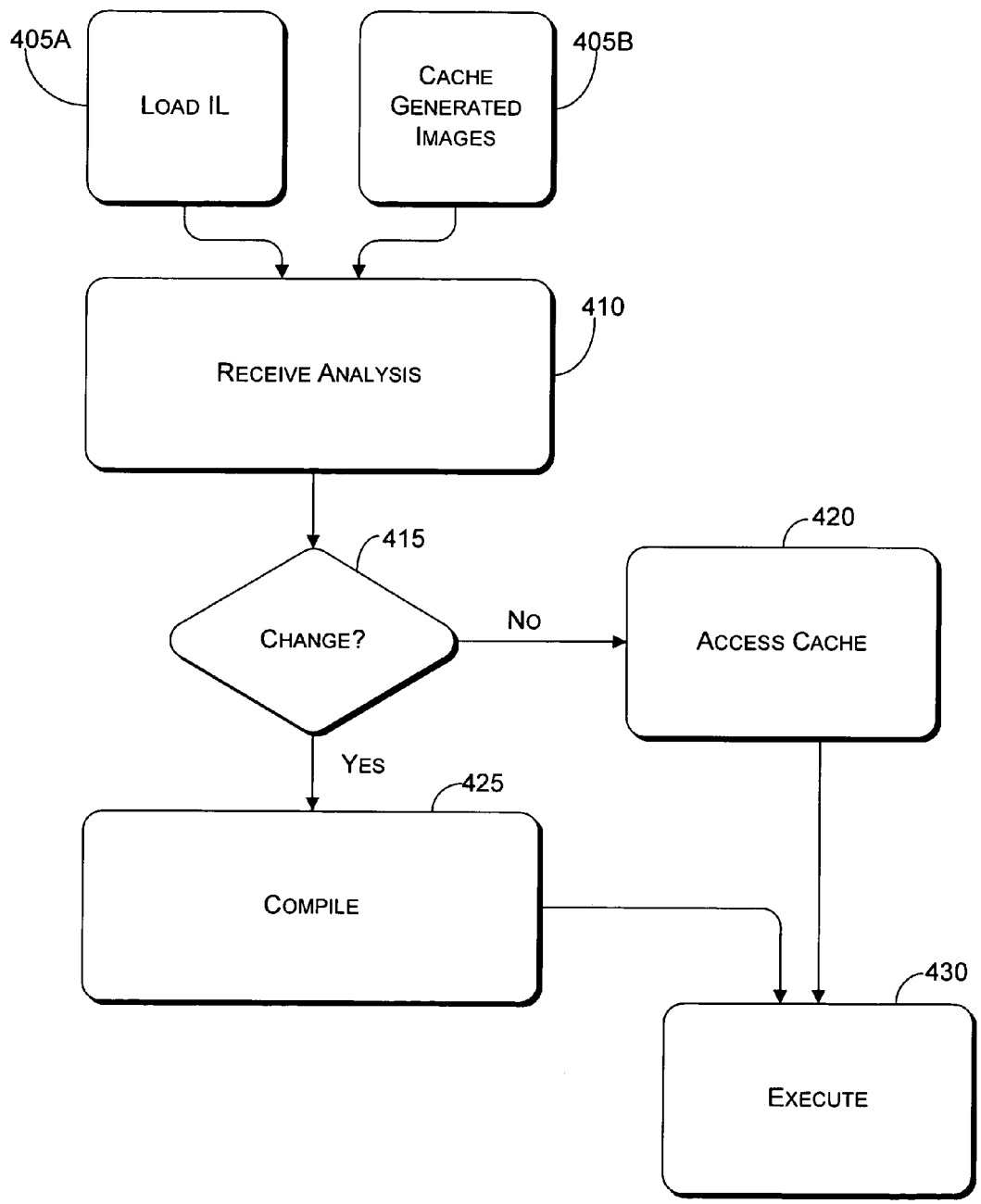
FIG. 4 shows an example processing flow in accordance with an example implementation of a code compilation management service.

In the description of the modules of FIG. 2, which may also be referred to by the descriptions of FIGS. 3 and 4, various operations may be described as being performed by different modules of runtime execution environment 200. The operations that are described with respect to a particular module may be carried out by the particular module itself, by the particular module in cooperation with another of the modules of runtime execution environment 200, or by the particular module in cooperation with a processing module from an unmanaged execution environment. Thus, the descriptions provided herein pertain to example implementations, and are not intended to be limiting in any manner.

Accordingly, runtime execution environment 200 may facilitate execution of managed code for either of an application programming or application execution platform. Managed code may be considered to be part of a core set of application-development technologies, and may further be regarded as code that is compiled for execution on runtime execution environment 200 to provide a corresponding service to the computing device platform. In addition, runtime execution environment 200 may translate managed code at an interpretive level into instructions that may be proxied and then executed by a processor. A framework for runtime execution environment 200 also provides class libraries, which may be regarded as software building blocks for managed applications.

According to a further example implementation, runtime execution environment 200 may provide at least partial functionality that may otherwise be expected from a kernel, which may or may not be lacking from a computing device platform depending upon resource constraints for the particular one of device 105, 110, and 115. Thus, at least one example of runtime execution environment 200 may implement the following: input/output (hereafter "I/O") routine management, memory management, compilation, and service routine execution. Thus, runtime execution environment 200 may include I/O module 205, at least one memory management module 210, compiler 215, and execution module 220, which may be alternatively referred to as a virtual machine. These modules are to be described in further detail below, and are provided only as examples, and may be implemented in examples of runtime execution environment 200 in various combinations and configurations thereof. The examples are not intended to be limiting to any particular implementation of a runtime execution environment, and no such inference should be made.

I/O module 205 of runtime execution environment 200 may provide asynchronous access to data sources (i.e., processor and peripherals) associated with either of an application programming or application execution platform. More particularly, I/O module 205 may provide runtime execution environment 200 with robust system throughput and further streamline performance of code from which an I/O request originates.

Memory management module 210 may be regarded as a "garbage collector." Garbage collection may be regarded as a robust feature of managed code execution environments by which an object is automatically freed (i.e., de-allocated) if an object is no longer used by any applications, upon a sweep or scan of a memory heap. In at least one example of memory management module 210, a sweep of free memory heap may be implemented as a linear search. Such implementation may be well-suited for an example of a computing device platform for which memory size is constrained and for which a delay in completion of a sweep may be perceived by a user of a corresponding device.

Further functions implemented by memory management module 210 may include: managing one or more contiguous blocks of finite volatile RAM (i.e., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Compiler 215 may refer to a module within runtime execution environment 200 that may interpret compiled IL into native machine instructions for execution in runtime execution environment 200 by, e.g., execution module 220 or, alternatively, for execution by a CPU in a non-managed execution environment.

Execution module 220 may enable execution of managed code (i.e., compiled native code) for the computing device platform. Execution module 220 may be regarded as a module in which execution of the code compiled by compiler 215 may be implemented in runtime execution environment 200, and in which runtime services (e.g., device access and memory management) may be provided.

FIG. 3 shows example data flow 300 in accordance with at least one example implementation of code compilation management services 120 (see FIG. 1). Data flow 300 may be described with reference to the features of runtime execution environment 200 (see FIG. 2), although such implementations are illustrative of examples only, and are not intended to be limiting in any manner.

Intermediate language code (hereafter "IL") 305 may refer to at least a portion of one or more of an application, program, method, function, or other assemblage of programmable and executable code that has been compiled for execution in runtime execution environment 200 or, alternatively, by a CPU in a non-managed execution environment on any of devices 105, 110, and 115. More particularly, IL 305 may represent software components that are distributed in an IL format rather than in a native platform execution format, and that is compiled into any one of assemblies, methods, or types.

A source of IL 305 may be disposed in either of a non-managed execution environment or a separate implementation of a runtime execution environment on a same or separate one of devices 105, 110, and 115. The source may deploy IL 305 at, or prior to, install time for the application, program, method, function, or other assemblage of programmable and executable code to which IL 305 corresponds.

Image generator 310 may refer to a native image generator to generate specialized native image components for at least portions of IL 305. More particularly, along with the received IL 305, image generator 310 may receive environment information from a native image service (not shown), and compiler 312 may then compile the environment information to generate the aforementioned specialized native image components of the received IL 305 at install time for the application, program, method, function, or other assemblage of programmable and executable code to which IL 305 corresponds. The specialized native image components may be further regarded as specialized compiled instances of IL 305, and the native image service may or may not be the source of IL 305.

Cache 315 may refer to a native image repository to store at least the specialized native image components generated by image generator 310 in a disk-based executable format. The contents of cache 315 may be preferred for execution by runtime execution environment 200, or the alternative CPU, over a re-compiled version of IL 305 since re-compilation of even portions of IL 305 may incur a resource and/or time cost that impedes efficient execution.

Service 320 may refer to a service that may dynamically determine when IL 305 is to be recompiled for execution by runtime execution environment 200 or, alternatively, by a CPU in a non-managed execution environment. Service 320 may make such dynamic determinations and, consequently, schedule recompilation of at least portions of IL 305 received by loader 325 and runtime execution environment 200 upon receiving an analysis indicating that the specialized native image components stored in cache 315 may not be reliably executed. Such analysis may be provided, typically, by loader 325.

Receiver 322 may refer to a module within service 320 to receive an analysis or assessment of the contents of cache 315 from loader 325, or alternatively a CPU in a non-managed execution environment, attempting to execute at least portions of the specialized native image components stored in cache 315 at runtime. That is, either prior to or simultaneous with runtime, receiver 322 may receive an indication from loader 325, or the alternative CPU, that at least portions of the specialized native image components stored in cache 315 fail to withstand an analysis and are therefore may be incompatible with an execution request. According to further examples, receiver 322 may receive data regarding a context of the execution request from loader 325, as described further below, which is used as part of the aforementioned analysis.

The analysis provided by loader 325, or the alternative CPU, may take into consideration that the contents of cache 315 are loaded therein at install time, and are typically not accessed until runtime. Between install time and runtime or from one invocation to another, changes may occur with regard to the application, program, method, function, or other assemblage of programmable and executable code to which IL 305 corresponds; or changes may occur in the execution environment or processors in which execution is to occur. Accordingly, at least portions of the specialized native image components stored in cache 315 may not be compatible for execution in runtime execution environment 200 or by a CPU in an unmanaged execution environment.

Non-limiting examples of such changes, which may result in the incompatibility of at least portions of the specialized native image components stored in cache 315 for execution by runtime execution environment 200, or the alternative CPU, may include service pack upgrades, base assembly upgrades, changes to security settings, new profile guidance data, hardware upgrades, etc. More particularly, loader 325, or the alternative CPU, may implement an analysis of at least portions of the specialized native image components stored in cache 315 with regard to, as examples: CPU consistency, since the contents of cache 315 or portions thereof may target a particular processor, changes to a processor between install time and runtime may preclude executing at least portions of the content of cache 315; the renewal or updating of versions of framework components and/or runtime execution environment 200 may preclude executing at least portions of the content of cache 315; changing, between install time and runtime, security settings to the application, program, method, function, or other assemblage of programmable and executable code to which IL 305 corresponds, may preclude executing at least portions of the content of cache 315; and changing an execution context between install time and runtime may preclude executing at least portions of the content of cache 315. Of course the examples listed above are non-limiting, and are intended to provide just a sampling of the factors that may be accounted for when determining whether at least portions of the specialized native image components stored in cache 315 may be appropriately executed by runtime execution environment 200 or a CPU in an unmanaged execution environment.

Manager 324 may refer to a module within service 320 to utilize the analysis of at least portions of the content of cache 315 received from loader 325, or the alternative CPU, as well as an execution context that may also be received from loader 325, to predict a usage model for the requested code. That is, based on the analysis received from loader 325, or the alternative CPU, manager 324 may predict a usage model, including the timing of execution, for the requested code. Based on the predicted model, manager 324 may schedule compiler 312 in image generator 310 to recompile the requested code that were received in IL 305 by loader 325, as well as by image generator 310. The scheduled recompilation is performed by compiler 215.

Loader 325 may refer to an assembly manager that may be invoked to locate and read assemblies as needed. Loader 325 may be disposed in execution environment 200, although at least one implementation of an unmanaged execution environment (i.e., OS) may include loader 325 therein.

Further, loader 325 may garner at least IL 305, during deployment or install time, for loading into runtime execution environment 200. Effectively, loader 325 may serve as an entry point for IL 305 into runtime execution environment 200. Loader 325 may also send information regarding an execution context to execution service 320 for the particular file or portion of the specialized native image components stored in cache 315 that has been requested by runtime execution environment 200, or the alternative CPU. The information sent by loader 325 may include an analysis indicating whether or not portions of the specialized native image components stored in cache 315 may be reliably executed within runtime execution environment 200. Non-limiting examples of execution context may include debugging, security, versioning, etc., and may be influential for manager 324 in determining whether an appropriate version of a file or specialized native image components are stored in cache 315 for execution in runtime execution environment 200 or in an unmanaged execution environment.

Although the analysis provided by loader 325 may result in manager 324 scheduling compiler 312 to recompile requested code that was received in IL 305, at least one alternative implementation of code compilation management service 120 may include the recompiling being implemented in runtime execution environment 200. Therefore, runtime execution environment 200 may include compiler 215 to recompile at least portions of IL 305 as scheduled or otherwise instructed by service 320. That is, when receiver 322 receives an indication from loader 325, or the alternative CPU, that at least portions of the content of cache 315 fail to withstand a heuristic analysis and are therefore incompatible with an execution request, manager 324 may schedule or otherwise manage the recompilation of the requested code that were received in IL 305 by loader 325 at install time. The management of such recompilation may include manager 324 populating compiler 215 with appropriate portions of IL 305, as requested for execution, and scheduling the recompilation by compiler 215 in advance or on-demand.

Runtime execution environment 200 further includes execution module 220 to enable execution of managed code. Execution module 220 may be regarded as an environment in which execution of at least portions of the specialized native image components accessed from loader 325 or code compiled by compiler 312 may be executed in runtime execution environment 200.

FIG. 4 shows example processing flow 400 in accordance with an example implementation of a code compilation management service 120 (see FIG. 1). Processing flow 400 may be described with reference to the features of runtime execution environment 200 (see FIG. 2) and data flow 300 (see FIG. 3), although such implementations are illustrative of examples only, and are not intended to be limiting in any manner.

Block 405A may refer to IL 305 corresponding to at least a portion of an application, program, method, function, or other assemblage of programmable and executable code being loaded, at install time, in both image generator 310 and loader 325.

Block 405B may refer to image generator 310 generating specialized native image components (i.e., specialized compiled instances) of received IL 305, which may then be stored in cache 315.

Block 410 may refer to service 320, particularly receiver 322, receiving an analysis or assessment of at least portions of the content of cache 315 from loader 325, or an alternative CPU in a non-managed execution environment, that may be attempting to execute at least portions of the specialized native image components stored in cache 315 at runtime. That is, either prior to or simultaneous with runtime, receiver 322 may receive an indication from loader 325, or the alternative CPU, that at least portions of the content of cache 315 fail to withstand a heuristic analysis and are therefore incompatible with an execution request.

Decision 415 may refer to service 320, particularly manager 324, performing an analysis to determine whether any changes have occurred, between install time and runtime, with regard to any one of the application, program, method, function, or other assemblage of programmable and executable code to which at least portions of the specialized native image components stored in cache 315 correspond, or in the execution environment or to the processors in which execution is to occur.

Decision 415 may include an analysis implemented by manager 324 of the contents of cache 315 with regard to, as examples: CPU consistency; versioning of framework components and/or runtime execution environment 200; security settings to the application, program, method, function, or other assemblage of programmable and executable code to which at least portions of the specialized native image components stored in cache 315 correspond; and a context of the requested execution.

Block 420, upon negative decision 415, may refer to manager 324 enabling or otherwise permitting runtime execution module 220, or the alternative CPU, to access at least portions of the contents of cache 315 for execution.

Block 425, upon positive decision 415, may refer to manager 324 utilizing the analysis of the contents of cache 315 received from loader 325, or the alternative CPU, as well as an execution context that may be received from loader 325, to predict a usage model for the requested code. The usage model may include the timing of execution for the requested code, and therefore manager 324 may schedule recompilation of the requested code that was received in IL 305 by loader 325, as well as by image generator 310. The scheduled recompilation is performed by compiler 312. However, at least one alternative implementation of code compilation management service 120 may include the scheduled recompilation being implemented by compiler 215 in runtime execution environment 200.

Block 430, following both blocks 420 and 425, may refer to execution module 220, or the alternative CPU, executing the requested code. Following block 420, block 420 may refer to execution module 220 executing at least portions of the specialized native image components accessed from cache 315. Following block 425, block 420 may refer to execution module 220 executing at least portions of IL 305 that have been recompiled.

According to the example implementations described above, software components that are distributed in IL formats, rather than in native platform execution formats, may be efficiently executed with minimal impact on machine resources.

It is to be understood that the computer environment for any of the examples and implementations described above may include a computing device having, for example, one or more processors or processing units, a system memory, and a system bus to couple various system modules.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE- PROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

I claim:

1. A method, comprising:
receiving information regarding managed code, wherein the information comprises an analysis from a loader module indicating whether a native image component of the managed code is reliably executable in a managed execution environment, and wherein the analysis accounts for at least one change associated with the managed code or the managed execution environment after an install time associated with the managed code, and wherein the at least one change comprises at least one of: a processor change, a security setting change of the managed code or the managed execution environment, new profile data, an upgrade or version change to the managed code or the managed execution environment, a component change of the managed execution environment, a change in an assemblage of code associated with the managed code, or a context change in the managed execution environment;
predicting a usage model for the managed code based on the information, wherein the usage model includes a timing of execution for the managed code in the managed execution environment;
scheduling a compilation of at least a portion of the managed code based on the usage model; and
performing the scheduled compilation.

2. The method of claim 1, wherein the method is implemented prior to or during a runtime associated with the managed code.

3. The method of claim 1, wherein the loader module is implemented in the managed execution environment.

4. The method of claim 3, wherein the loader module is configured to serve as an entry point for the managed code into the managed execution environment.

5. The method of claim 1, wherein the managed code is compiled in units of any of assemblies, methods, or types.

6. The method of claim 1, wherein the scheduling is further based on a processing load of the managed execution environment that is to execute the managed code.

7. At least one computer-readable medium having one or more executable instructions that, when read, cause one or more processors to:
receive at least one analysis of cached native image code components, wherein the analysis indicates whether individual cached native image code components are reliably executable in a managed execution environment;
determine whether at least a portion of the cached native image code components is to be compiled based on the received analysis, wherein to determine comprises determining whether a change associated with the cached native image code components or the managed execution environment has occurred between an install time and a runtime associated with the cached native image code components, and wherein the change comprises at least one of: a processor change, a security setting change of the cached native image code components or the managed execution environment, new profile data, an upgrade or version change to the cached native image code components or the managed execution environment, a component change of the managed execution environment, a change in an assemblage of code associated with the native image code components, or a context change in the managed execution environment;
predict a usage model based on the at least one analysis, wherein the usage model includes a timing of execution for the cached native image code components; and
schedule compilation for at least the portion of the cached native image code components based at least in part on the determination the usage model.

8. The least one computer-readable medium of claim 7, wherein the at least one analysis includes a static analysis of potential usage and configurations of the cached native image code components by a virtual machine in the managed execution environment.

9. The at least one computer-readable medium of claim 7, wherein the at least one analysis includes a dependency analysis regarding which of the cached native image code components are to be loaded into a virtual machine in the managed execution environment.

10. The at least one computer-readable medium of claim 7, wherein the one or more executable instructions, when read, further cause the one or more processors to determine, based at least in part on the analysis, whether the cached native image code components are appropriate for a processing context of a virtual machine in the managed execution environment.

11. The least one computer-readable medium of claim 7, wherein the one or more executable instructions, when read, further cause the one or more processors to order an on-demand compilation of at least the portion of the cached native image code components.

12. A system, comprising:
a receiver implemented at least in part by a computing device and configured to receive at least one analysis regarding intermediate language (IL) code from a loader in a runtime execution environment; and a manager configured to:
  determine whether at least one change associated with the IL code or the runtime execution environment has occurred, wherein the at least one change comprises at least one of: a processor change, a security setting change of the IL code or the runtime execution environment, new profile data, an upgrade or version change to the IL code or the runtime execution environment, a component change of the runtime execution environment, a change in an assemblage of code associated with the IL code, or a context change in the runtime execution environment;
  predict a usage model based on the at least one analysis, wherein the usage model includes a timing of execution of the IL code in the runtime execution environment; and
  schedule compilation for at least a portion of the IL code based at least in part on the usage model.

13. The system of claim 12, wherein the system is implemented as a service outside of the runtime execution environment.

14. The system of claim 12, wherein the at least one analysis indicates which portions of the IL code are to be loaded into a virtual machine in the runtime execution environment.

15. The method of claim 12, wherein the at least one analysis includes a static analysis of potential usage and configurations of the IL code by a virtual machine in the runtime execution environment.

* * * * *